United States Patent [19]
Hillmann et al.

[11] Patent Number: 4,728,968
[45] Date of Patent: Mar. 1, 1988

[54] ARRANGEMENT OF DISCHARGE OPENINGS IN A PRINTHEAD OF A MULTI-COLOR INK PRINTER

[75] Inventors: Ruediger Hillmann, Emmering; Artur Milbrandt, Munich; Hubertus Reinfeld, Penzberg; Emmeran Vollert, Grosshoehenrain, all of Fed. Rep. of Germany

[73] Assignee: Siemens Aktiengesellschaft, Berlin and Munich, Fed. Rep. of Germany

[21] Appl. No.: 886,829

[22] Filed: Jul. 18, 1986

[30] Foreign Application Priority Data

Aug. 30, 1985 [DE] Fed. Rep. of Germany ....... 3531097

[51] Int. Cl.[4] .................. G01D 15/16
[52] U.S. Cl. .................. 346/140 R; 400/126
[58] Field of Search .................. 346/140, 136; 400/126, 400/121

[56] References Cited

U.S. PATENT DOCUMENTS

| | | | |
|---|---|---|---|
| 4,320,406 | 3/1982 | Heinzl | 346/140 R |
| 4,511,907 | 4/1985 | Fukuchi | 346/140 |
| 4,554,556 | 11/1985 | Hirata | 346/140 X |
| 4,593,295 | 6/1986 | Matsufuji | 346/140 |
| 4,593,296 | 6/1986 | Dagna | 346/140 |

FOREIGN PATENT DOCUMENTS

| | | |
|---|---|---|
| 0021389 | 1/1981 | European Pat. Off. . |
| 0133167 | 2/1985 | European Pat. Off. . |
| 3337495 | 5/1985 | Fed. Rep. of Germany . |
| 58-12764 | 1/1983 | Japan . |

*Primary Examiner*—Joseph W. Hartary
*Attorney, Agent, or Firm*—Hill, Van Santen, Steadman & Simpson

[57] ABSTRACT

An arrangement of discharge openings in a printhead of a multi-color ink printer includes n discharge openings for ink droplets of a black color formed in a first vertical row and m discharge openings in each row for ink droplets of further fundamental colors forming further vertical rows. The discharge openings of each row have a spacing "a" and after a first pass of the write head across a recording medium, the recording medium is moved relative to the write head by at least half a print line height, or by half the spacing "a" of the discharge openings. The number of discharge openings n of the first row and the spacing "a" is selected so that characters can be represented in draft quality for a single pass of the write head, the characters being represented in near-letter quality by multiple passes of the write head.

7 Claims, 3 Drawing Figures

ARRANGEMENT OF DISCHARGE OPENINGS IN A PRINTHEAD OF A MULTI-COLOR INK PRINTER

BACKGROUND OF THE INVENTION

1. Field of the Invention

The present invention relates to an arrangement of discharge openings in a printhead of a multi-color ink printer.

2. Description of the Prior Art

Printing terminals and output devices found in modern office communications or data processing systems are generally required to present both text and graphics. For text representation, a high output rate is frequently desired in circumstances where reduced print quality is acceptable. Such reduced print quality is referred to herein as draft quality (DQ). In addition, there should also be the possibility of presenting text of very good print quality. For such good print quality, a reduced output speed is often acceptable. Such good print quality is referred to herein as near-letter quality (NLQ). Multi-color representations are also increasingly demanded for graphic presentations.

So-called ink printers have proven suitable devices to meet these demands. The ink printer comprises an ink printhead for representing characters or graphics. As is generally known, an ink printhead has a plurality of discharge openings formed as nozzles from which discrete droplets are ejected under the influence of individually driveable piezo-electric drive elements. The discrete droplets form the desired characters or desired graphic patterns in a grid fashion on a recording medium, which is moved relative to the printhead. The known devices which address the above-mentioned demands suffer from a disadvantage in that only one of the requirements is fully met in each device and other requirements are only provided with a more or less pronounced sacrifice in quality.

SUMMARY OF THE PRESENT INVENTION

It is an object of the present invention to specify an arrangement of nozzle discharge openings of a printhead in an ink printer means with which text can be represented in both draft quality as well as near-letter quality, and with which multi-color text or high-quality graphics can also be represented.

This and other objects are achieved in an ink printer printhead having a nozzle discharge opening arrangement with a first vertical row of openings for ejecting black ink and furtner vertical rows of openings for ejecting respective ones of fundamental colors of ink.

DETAILED DESCRIPTION OF THE PREFERRED EMBODIMENTS

Figure 1:
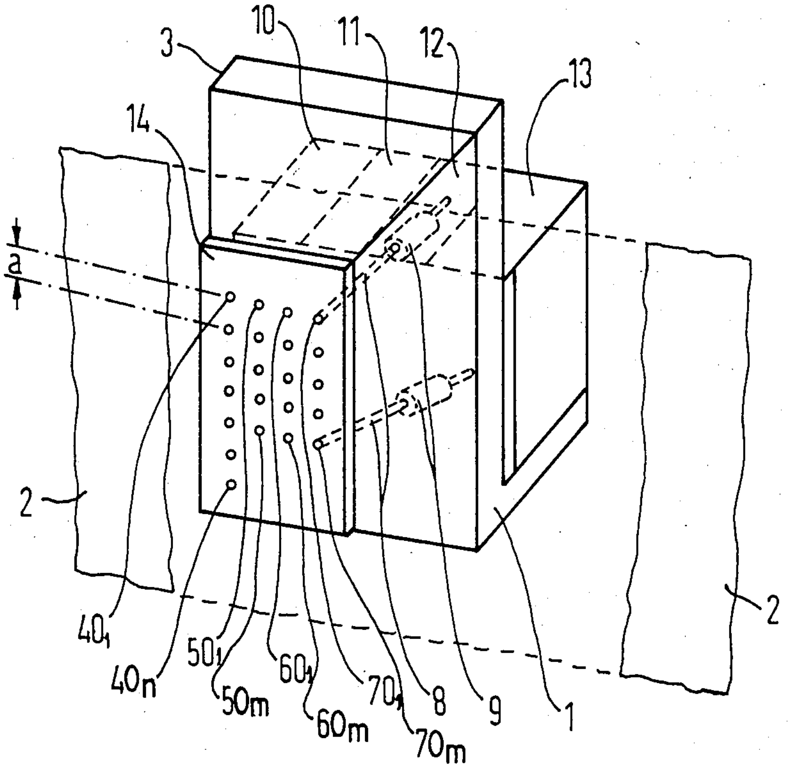
FIG. 1 is a perspective view of a printhead for an ink printer, including an ink discharge opening arrangement according to the present invention.

As shown in FIG. 1, an ink printer means for representing text and graphics includes a write head 1 in front of which is disposed a recording medium 2, such as paper. The write head 1 is essentially composed of an ink supply system 3 connected, on the one hand, to ink channels 8 extending inside the write head 1 and, on the other hand, to an assortment of ink reservoirs 10, 11, 12, and 13 containing inks of different colors. It is known to use inks having the colors black, cyan, magenta, and yellow for representing multi-colored characters in graphics. The write head 1 includes individually controllable drive elements 9, which are shown as piezo-electric transducers allocated to ones of the ink channels 8. The ink channels 8 end at a nozzle plate 14 disposed at a forward end of the write head 1 facing the recording medium 2. Individual ink droplets are ejected at relatively high speeds from discharge openings formed in the nozzle plate 14, as controlled by a transducer drive means (not shown), and are sprayed against the recording medium 2.

In accordance with the teachings of the present invention, the discharge openings of the write head 1 are arranged so that a first vertical row of n discharge openings $\mathbf{40}_1$–$\mathbf{40}_n$ are provided for ejecting ink droplets having a black color, such nozzles hereinafter being referred to as black nozzles. In the illustrated example of FIG. 1, n =7 discharge openings 40, although other numbers of openings 40 are also possible.

An additional plurality of discharge openings are provided in additional rows for ejecting ink droplets of different colors, m discharge openings being provided in each row. In the illustrated example of FIG. 1, m =5 for discharge openings $\mathbf{50}_1$–$\mathbf{50}_m$, $\mathbf{60}_1$–$\mathbf{60}_m$ and $\mathbf{70}_{1-70m}$ of each respective row. Hereinafter, the discharge openings 50, 60, and 70 will be referred to as color nozzles. In one embodiment, the different colors for the color nozzles are the fundamental colors in what is referred to as the subtractive color mixing system, wherein the colors cyan, magenta, and yellow are used.

All of the discharge openings 40, 50, 60 and 70 are arranged in a vertical direction at a spacing "a", whereby "a" is defined by the grid provided for the character representation and is selected such that individual ink dots applied in the grid correspond to draft quality representations or printing. At least the plurality n of black nozzles 40 is selected such that they cover the height of a write line provided by the character grid.

With the foregoing, a representation, or printing, in draft quality can be made in a single pass. The number of discharge openings $\mathbf{50}_1$–$\mathbf{50}_m$, $\mathbf{60}_1$–$\mathbf{60}_m$, and $\mathbf{70}_1$–$\mathbf{70}_m$ in each row of the color nozzles may be lower in number than the number of black nozzles $\mathbf{40}_1$–$\mathbf{40}_n$ ($n>m$). However, the color nozzles 50, 60, and 70 are arranged at the same horizontal level as respective ones of the black nozzles 40. Thus, in multi-color printing, it is possible that printing points of black color ink are no longer formed by mixing the three fundamental colors of ink but, to the contrary, are formed by ink droplets having a black color. The present invention may be used to produce both draft quality and near-letter quality characters, as set forth hereinafter with reference to FIGS. 2 and 3.

Figure 2:
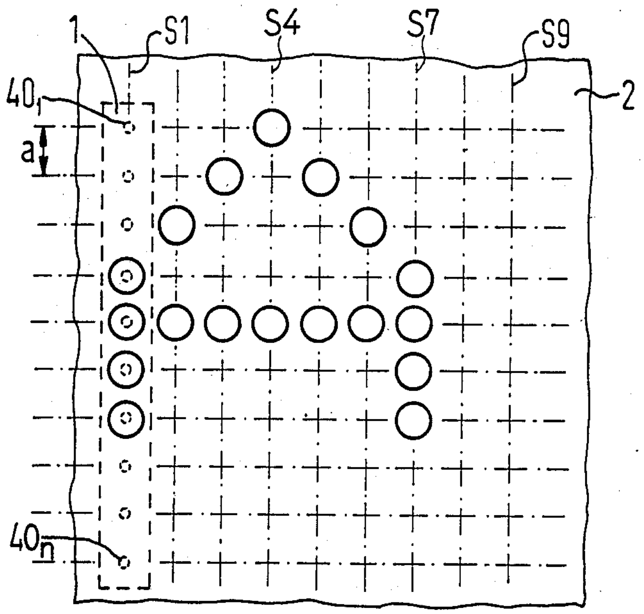
FIG. 2 shows a character grid on a recording medium for representing text in draft quality using another embodiment of an ink discharge opening arrangement.

In FIG. 2, a 9×10 character grid is defined for representing text in draft quality. For the sake of clarity, only black ink discharge openings 40 of the write head 1 are shown, the discharge openings 40 being shown in broken outline disposed behind the recording medium 2. The spacing "a" of the discharge openings 40 is equal to 1/60 inches in the illustrated example. The standard character height of 1/6 inches is, thus, covered by n=10 discharge openings.

During the printing of characters, the write head 1 in the example moves from the left to the right at a constant speed. Droplets are ejected from selected discharge openings 40 at predetermined printing times by a printer control (not shown). The printing times are defined here by the grid columns S1 through S9. In FIG. 2, the character "A" is formed in draft quality. The characters of a single print line are, thus, printed during one pass of the write head 1. Thereafter, the recording medium 2 is transported by one line height so that the next print line can be printed in the same way during a return pass of the write head 1.

The printing of colored characters fundamentally occurs in the same way, whereby the recording medium 2 is transported by half a line height after the conclusion of a single pass in the illustrated example, where $m=\frac{1}{2}n$.

For representing characters or graphics in the higher quality near-letter quality, a multi-pass mode is used. The multi-pass mode is a plurality of passes of the printhead per print line to represent the characters. The relative motion between the recording medium 2 and the write head 1 occurs in fine steps and a print clock portion of the printer control is emitted as a fine subdivision of the printing times defined by the grid S1–S9. The fine stepping of the relative motion between the write head 1 and the printing medium 2 is caused by a micro-line circuit. The subdivision of the printing times, or grid clock, is achieved in that the printer control generates character-augmenting printing pulses in half steps.

Figure 3:
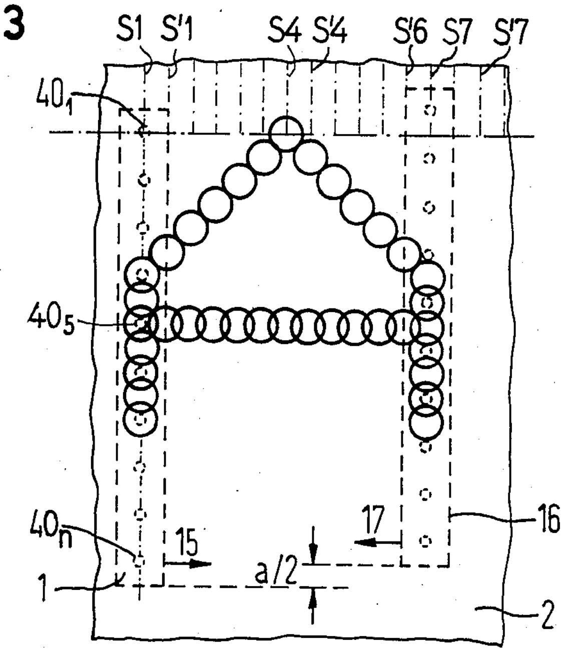
FIG. 3 shows a character grid on a recording medium for representing text in near-letter quality using the arrangement shown in FIG. 2.

Referring now to FIG. 3, a 17×20 grid for representing a character in near-letter quality is shown. The printing of the character "A" occurs in that the write head 1 (shown in broken lines) is first moved in a direction 15 and the printer control emits print pulses at all respective horizontal print locations, the horizontal print locations being the grid columns S1–S9 and by the half-print step columns S'1–S'8 between S1 and S9. In this way, the horizontal cross-bar line of the character "A" is formed by a greater number of printing points from the discharge opening $\mathbf{40}_5$.

After the end of the print line being printed has been reached, the printer control initiates a feed of the recording medium 2 corresponding to half the spacing "a" of the discharge openings 40. The write head 1 now assumes the position 16 shown in FIG. 3 relative to the recording medium 2. The write head 1 returns in a direction 17, thereby filling the vertical and oblique lines of the illustrated character "A" with ink dots intermediate those printed in the final pass. The ink dots in the near-letter quality, thus, have a double density as compared to the draft quality printed letter "A".

It is also contemplated to divide the draft quality grid more finely than by half-steps. For example, a subdivision into thirds or quarters produces a very high quality result.

Although various alterations and modifications might be suggested by those skilled in the art, it should be understood that we wish to embody within the scope of the patent warranted hereon all such modifications as reasonably and properly come within the scope of our contribution to the art.

We claim as our invention:

1. An arrangement of discharge openings in a printhead of a multi-color printer having the discharge openings connected by ink channels to ink reserviors and each ink channel having a piezo-transducer for ejecting discrete droplets from the discharge openings when the piezo-transducers are individually driven, the printhead being movable in line direction across a recording medium, comprising:

a plurality of first discharge openings in a first vertical row provided for ejecting black-colored ink droplets, the number and mutual spacing of said plurality of first discharge openings being such that draft quality characters are representable on a write line of the recording medium; and a plurality of second discharge openings in further vertical rows provided for ejecting ink droplets of at least three fundamental colors, one of said further vertical rows being provided for each of said fundamental colors, the mutual spacing of said second discharge openings in said further vertical rows corresponding to the mutual spacing of said first vertical row;

said first discharge openings for ejecting black ink being greater in number than said second discharge openings for each one of said fundamental colors in said further rows;

whereby the recording medium is transported in a vertical direction after recording of one print line and for draft quality printing is transported in a vertical line height and for near-letter quality printing is transported by half the spacing of said first discharge openings in said first vertical row.

2. An arrangement as claimed in claim 1, wherein the number of said first discharge openings for ejecting black-colored ink is twice the number of said second discharge openings provided for each one of said fundamental colors in said further vertical rows.

3. An arrangement as claimed in claim 1, wherein the printhead multiply traverses a print line to represent near-letter quality characters.

4. An ink jet printhead for multi-color printing having ink reservoirs linked by ink channels to ink driving means, the printhead being movable with respect to a recording medium, comprising:

a first vertical row of black ink discharge openings connected by said ink channels to one of said ink reservoirs for holding black ink, said black ink discharge openings being equally spaced from adjacent black ink discharge openings, the length of said first vertical row defining a write line on said recording medium;

a second vertical row of first color discharge openings parallel to said first vertical row, said first color dischagre openings being connected by ink channels to another one of said ink reservoirs for holding a first color ink, said first color discharge openings being spaced from adjacent first color discharge openings by an amount equal to the spacing of said black ink discharge openings, said first color discharge openings being fewer in number than said black ink discharge openings, the length of said second vertical row being at least half the length of said first vertical row, a third vertical row of second color discharge openings parallel to said first vertical row, said second color discharge openings being connected by ink channels to another one of said ink reservoirs for holding a second color ink, said second color discharge openings being spaced from adjacent second color discharge openings by an amount equal to the spacing of said black ink discharge openings, said second color discharge openings being fewer in number than said black ink discharge openings, the length of said third vertical row being equal to the length of said second vertical row and;

a fourth vertical row of third color discharge openings parallel to said first vertical row, said third color discharge openings being connected by ink channels to another one of said ink reservoirs for holding a third color ink, said third color discharge openings being spaced from adjacent third color discharge openings by an amount equal to the spacing of said black ink discharge openings, said third color discharge openings being fewer in number than said black ink discharge openings, the length of said fourth vertical row being equal to the length of said second vertical row;

whereby draft quality printing is produced by a first pass of said printhead over a write line and near-letter quality printing is produced by two passes of said printhead over a single write line.

5. An ink jet printhead as claimed in claim 4, wherein ten black ink discharge openings are in said first vertical row.

6. An ink jet printhead as claimed in claim 4, wherein said first color ink is cyan, said second color ink is magenta, and said third color ink is yellow.

7. An arrangement of discharge openings in a printhead of a multicolor ink printer in which the discharge openings are connected to ink reservoirs through ink channels, the ink reservoirs having ink of a black color and ink of at least three primary colors, the discharge openings for ejecting ink droplets of the black ink form a vertical row, the discharge openings for ejecting ink droplets of the other primary colors form further vertical rows, a piezo transducer provided at every ink channel which when individually driven drive individual droplets from the discharge openings, the printhead being movable across a recording medium in a line direction and the recording medium being movable perpendicular to the line direction, comprising:

a plurality of the discharge openings for ejecting black ink having a number and mutual spacing such that characters can be represented on the recording medium over the height of a write line in draft quality, the number of said black ink discharge openings being greater than the number of discharge openings for each respective primary color, the discharge openings in each of the further rows for ejecting the other primary colors corresponding in spacing to the spacing of the black ink discharge opening, and the recording medium being moved in a direction perpendicular to the line direction after recording a respective write line by at least half a write line height for recording in draft quality and by a value corresponding to half the mutual spacing of the discharge openings in a row for recording in near letter quality.

* * * * *